United States Patent [19]

Zwart

[11] 3,964,527

[45] June 22, 1976

[54] METHOD AND APPARATUS FOR FILLING SPACING CORE

[75] Inventor: Robert L. Zwart, Cypress, Calif.

[73] Assignee: McDonnell Douglas Corporation, Long Beach, Calif.

[22] Filed: May 24, 1974

[21] Appl. No.: 473,008

Related U.S. Application Data

[63] Continuation of Ser. No. 204,101, Dec. 2, 1971, abandoned.

[52] U.S. Cl. .................................. 141/8; 141/67; 181/33 GA; 264/69; 264/267
[51] Int. Cl.² ........................................... B65B 31/00
[58] Field of Search ............. 52/615; 156/73, 197, 156/285; 161/68, 69; 181/33 G, 33 GA, 33 HB; 264/69, 71, 91, 102, 267, DIG. 78; 141/1, 4, 5, 7, 8, 11, 67, 12, 65, 72, 240, 244, 280, 281, 283

[56] References Cited

UNITED STATES PATENTS

| 2,700,632 | 1/1955 | Ackerlind | 181/33 GA |
| 2,744,042 | 5/1956 | Pace | 181/33 GA |
| 3,585,100 | 6/1971 | Greenless | 264/102 X |
| 3,712,785 | 1/1973 | Hirt et al. | 264/71 X |

Primary Examiner—Richard E. Aegerter
Assistant Examiner—Frederick R. Schmidt
Attorney, Agent, or Firm—John P. Scholl; Walter J. Jason; Donald L. Royer

[57] ABSTRACT

Spacing core materials, such as honeycomb, may be filled with fibrous insulation batting by placing the spacing core on a vibrator over the batting. The lower edges of the core cut through the fibrous material and permit it to fill the core. Additionally, a vacuum from the top side uniformly distributes the material in the core cells in an expanded condition.

3 Claims, 4 Drawing Figures

METHOD AND APPARATUS FOR FILLING SPACING CORE

This is a continuation of application Ser. No. 204,101, filed Dec. 2, 1971 and now abandoned.

BACKGROUND OF THE PRESENT INVENTION

A structural spacing core material, popularly known as honeycomb, is often sandwiched between a pair of exterior panels to provide a lightweight, high strength, rigid panel which has many uses of which building material, building partitions, ceilings and aircraft cabin interiors are but a few examples. These panels, in this form, have very little sound absorption capability. To increase sound absorption, the cells were filled with an acoustical absorbing media such as a compressible fiberous batting or a fiberglass wool. Normally, this was a hand-operation, such as by rolling, punching or hand-stuffing. It is important in filling the honeycomb cells with the sound absorbing material that the fibers be fully contained within the cells without extending across the edge surfaces that are to be bonded to the outer panels.

SUMMARY OF PRESENT INVENTION

A method and apparatus of cutting and inserting compressible fiberous insulation batting into the cells of honeycomb material utilizes the technique of cutting the batting by the vibratory action of the compressed insulation against the honeycomb core stock. An abrasive surface under the insulation assists in obtaining a clean cut with a minimum of loose fibers. The cut batting shapes within the cells are compressed less than by other methods as the vibration tends to keep the batting expanded. A light vacuum pulled through a fine steel mesh on the opposite face of the honeycomb will further fluff the cut batting and position the batting uniformly in the honeycomb structure. In this manner the fibers are not pulled or torn but are cut to fit into the honeycomb cells. There is no possible damage to the honeycomb cell structure which occurs with cutting operations on the flat face, whether the honeycomb be of metal, paper or other material. This method is usable on all types of rigid open cell core stock, whether it be metallic or non-metallic.

DETAILED DESCRIPTION OF ILLUSTRATIVE EMBODIMENT

Figure 1:
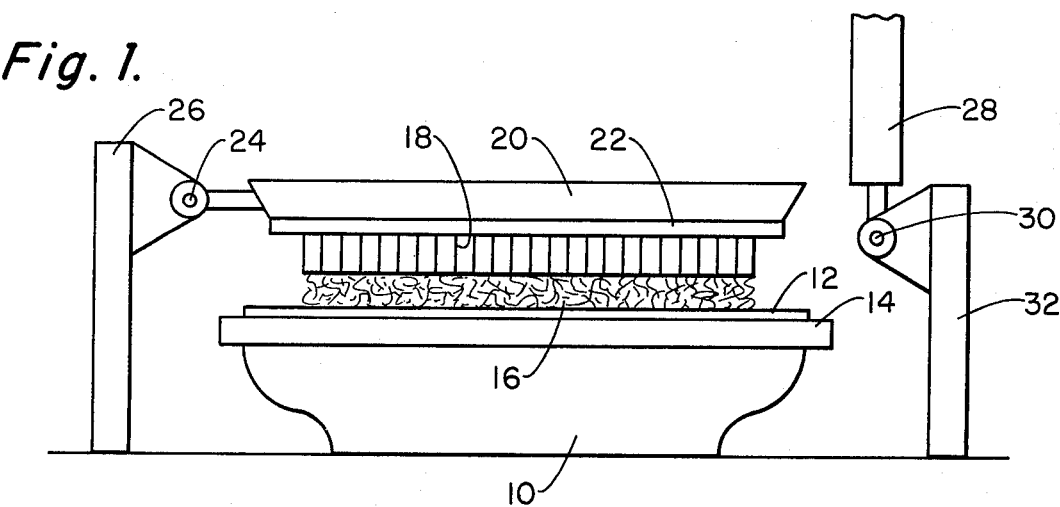
FIG. 1 is an elevational sectional view showing the apparatus with the honeycomb core and fiberous material in position ready for the cutting and stuffing operation.

Reference is now made to FIG. 1 wherein there is shown a vibrating table or platen device 10 upon which is placed an abrasive of coating of medium grade (180–280) 12 is positioned on the work surface 14. The batting material 16 is laid in place and the structural core material 18 is laid over the batting 16. A weighted press plate 20, having its soft holding pad 22 bonded thereto is pivotally mounted at 24 to a support structure 26. A vacuum draw apparatus 28 is pivotally mounted at 30 to another support structure 32 and remains in its upright, non-use position, as shown. With the apparatus and materials as shown, the vibrating table 10 is set in motion and horizontal oscillations are made in the direction of arrows 34, 36 in FIG. 2. A vibration cycle rate in the range of from 1700 to 3000 per minute has proven most satisfactory. As the table vibrates, the lower edges of the cellular core 18, under a positive pressure from plate 20, cut through the thickness of the fiberous batting to force the fiberous material into the closed area of the cells.

Figure 2:
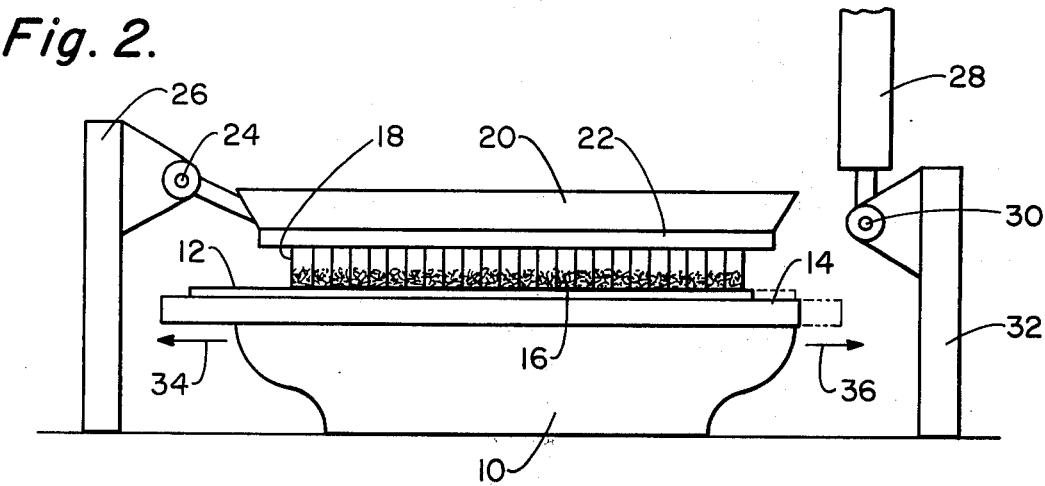
FIG. 2 is a sectional elevational view after the cutting operation has been performed.
Figure 3:
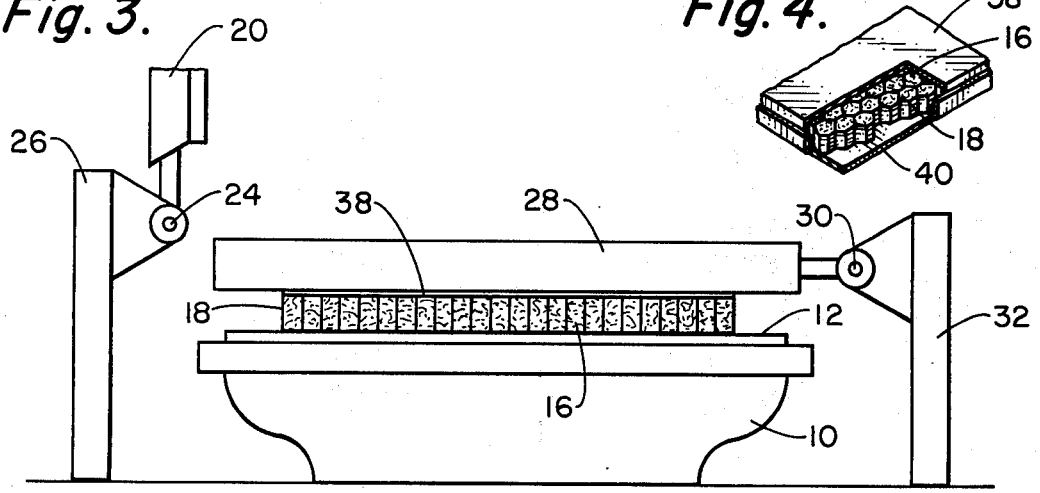
FIG. 3 is a sectional elevational view after the vacuum draw operation has been performed and the fiberglass material is uniformly dispersed throughout the honeycomb cells.
Figure 4:
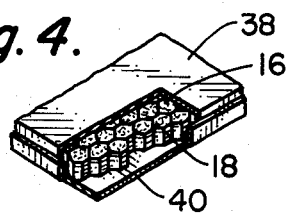
FIG. 4 is a perspective view with portions removed showing the completed panel.

Depending upon the thickness of the batting and the thickness of the cellular core, the cut fiberous material fills the lower portion of the cells, as shown in FIG. 2. In order to obtain a more uniform density of fiberous material throughout the thickness of the core, the press plate 20 is raised, as shown in FIG. 3, and the vacuum draw apparatus 28 is placed over the core. A fine mesh screen 38 (on the order of 100 mesh) over the core prevents the fiberous material from passing into the vacuum draw equipment. The vacuum causes the fiberous material to fill the cells uniformly, as shown in FIG. 3. When this is done, the vacuum is removed, the filled structural core is withdrawn and is ready for subsequent bonding of the exterior panels 38, 40 shown in FIG. 4.

Having thus described an illustrative embodiment of the present invention, it is to be understood that modifications thereof will become apparent to those skilled in the art and it is to be understood that these deviations are to be construed as part of the present invention.

I claim:

1. A method for filling spacing core with fibrous material comprising the steps of:
    1. placing a layer of compressible fibrous material on a flat base,
    2. placing a sheet of rigid open cell core stock on said fibrous material,
    3. placing a weight over said core stock,
    4. vibrating said base until the lower edges of said core stock cut through said layer of fibrous material so that the resulting cut portions of said compressible fibrous material expands into the open cells of said cell core stock and,
    5. subjecting said core stock to a partial vacuum from the top thereof to uniformly fill the cells of said core with cut portions of said fibrous material.

2. A method for filling spacing core with fibrous material comprising the steps of:
    1. placing a layer of compressible fibrous material on a flat base,
    2. placing a sheet of rigid open cell core stock on said fibrous material,
    3. placing a weight over said core stock,
    4. vibrating said base until the lower edges of said core stock cut through said layer of fibrous material so that the resulting cut portions of said compressible fibrous material expands into the open cells of said cell core stock,
    5. placing a fine mesh screen over the top of said core stock, and
    6. pulling a light vacuum through said screen to fluff and position the cut fibrous material uniformly in said core stock.

3. Apparatus for filling spacing core with compressible fibrous material comprising a flat base upon which a layer of fibrous material and a sheet of rigid open cell core stock may be placed, a weighted press plate for positioning over said fibrous material and said core stock, means for vibrating said base to enable said core stock to cut through said fibrous material and the cut portions of said compressible fibrous material to expand into the cells of said core stock, and vacuum draw apparatus including a screen for positioning over said core stock after vibrational cutting of said fibrous material has occurred to fluff said material and uniformly fill said cells.

* * * * *